United States Patent Office 2,957,845
Patented Oct. 25, 1960

2,957,845

POLYTHIOUREA AND POLYSULFIDE CO-CURED RESINS

George L. Wesp, Dayton, Ohio, assignor to Monsanto Chemical Company, St. Louis, Mo., a corporation of Delaware No Drawing. Filed Dec. 31, 1958, Ser. No. 784,019

6 Claims. (Cl. 260—42)

The invention relates to synthetic resins formed by co-curing mixtures of linear polythiourea and polysulfide polymers.

Polythiourea high polymers have long been known. They are conveniently prepared by a number of methods, perhaps the simplest being the reaction of a diamine with carbon disulfide; a condensation polymerization is effected wherein hydrogen sulfide is eliminated and the resulting high polymer is called a polythiourea. Various other procedures are available for making polythioureas such as by reaction of a trithiocarbonic acid and a polyamine, reaction of a polyamine with a bis(dithiocarbamate), reaction of a diamine with ammonium thiocyanate, and reaction of a polyamine with a polyisothiocyanate. See U.S. Patent 2,313,871 for further details. The type of diamines and resulting recurring unit in a polythiourea is subject to almost infinite variation. Most polythiourea polymers are of comparatively high melting point, e.g., above 50 or 100° C., and usually above 150° C. The properties of a polythiourea are dependent on the initial reactants and on the extent of polymerization. The most favored type of diamine reactant is the alkylene diamine, e.g. hexamethylene diamine (1,6-diamino-n-hexane), but all sorts of other diamines having straight-chain, branched chain or cyclic structure and consisting of carbon and hydrogen or also including hetero-atoms have also been mentioned as reactants for use in making polythioureas. Principal interest, however, has been in those reactants and reaction condition which give high melting point fiber-forming polymers. In my copending application Serial No. 422,256, filed April 9, 1954, now U.S. 2,884,401, there is described a rubbery polythiourea having extraordinary solvent resistance and further having good response to reinforcement by carbon black.

The polysulfide polymers have also long been known. These polymers are sometimes called elastothiomers and they are formed by the double decomposition products of various dihalides and alkali polysulfides. J. C. Patrick is credited for making the basic discovery of this type of polymer. An early patent of Patrick's describes this type of polymer in U.S. 1,890,191. This type of polysulfide polymer is marketed by the Thiokol Corporation under the trademark "Thiokol." These polymers can be compounded and vulcanized to form synthetic rubber. Details of the chemistry of the polysulfide polymers are found in the text, "The Chemistry of Commercial Plastics" by Wakeman (1947), page 600 et seq.

It is an object of this invention to provide improved cured resins having good tensile strength, low temperature properties and solvent resistant.

These and other objects of the invention will become apparent as the detailed description of the invention proceeds.

Surprisingly, it has been found that linear polythiourea polymers and linear polysulfide polymers similar to those described hereinabove can be co-cured to produce new resins having good tensile strength, low temperature properties and solvent resistance.

Polythioureas in general are usable in making the resins of the invention. Suitable polythioureas are described in U.S. 2,313,871 and other suitable polythioureas are described in my copending application Serial No. 422,256, filed April 9, 1954. However, the preferred polythioureas for use in the invention can be represented by the following type formula in which the "chain" has at least 2 carbon atoms:

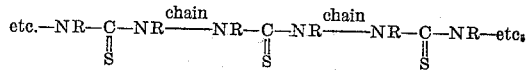

In the foregoing formula R preferably represents hydrogen or less preferably a monovalent hydrocarbon radical, especially alkyl. The "chain" can include one or more hetero-atoms such as oxygen, sulfur or nitrogen, the preferred one being oxygen. Where a plurality of hetero-atoms is present, they should be separated from each other by at least one and preferably two or more carbon atoms. Particularly suitable polythioureas are those containing a "chain" of from 2 to about 13 atoms between nitrogen atoms of adjacent thiourea residues, the terminal members of such chains being carbon atoms.

Those skilled in the art, having the benefit of the present disclosure will understand various types of reactants and reaction procedures available for making polythioureas having the limitations herein described. As a matter of convenience and referring to the preferred class of reactants the discussion given hereafter will be principally concerned with the reaction of a diamine with carbon disulfide; however, the various other types of reactants known to give polythioureas for example, as described in the aforementioned U.S. Patent 2,333,871 and elsewhere in the art, can also be used with suitable modifications which will be understood by those skilled in the art.

The preparation of a polythiourea from carbon disulfide and a diamine, generally involves reacting carbon disulfide with a diamine having the formula

wherein R is hydrogen or a monovalent hydrocarbon radical, preferably hydrogen, or if a hydrocarbon radical, preferably a lower alkyl group, and where the R's can be the same or different in the diamine, and wherein X comprises a chain of at least 2 carbon atoms and preferably not more than about 13 atoms including one or more hetero-atoms selected from the group consisting of oxygen, sulfur and nitrogen. In theory equimolar quantities of carbon disulfide and diamine reactants can be used but is preferred to charge an excess of carbon disulfide over the theoretical quantity required in order to obtain more efficient reaction; unreacted carbon disulfide is later removed by evaporation from the polymeric material. The reaction is conveniently effected in a solvent, e.g. methanol, phenol, water, benzene, etc. After initial reaction of carbon disulfide with diamine the resulting material is heated to a temperature which can suitably be within the range of 100 to 200° C. until the condensation polymerization has continued to the desired extent. The reaction liberates hydrogen sulfide which is preferably continuously removed. The reaction period will ordinarily be at least 1 hour and frequently will be within the range of 2 to 6 hours. To a certain extent the reaction time is inversely proportional to the temperature. It is often convenient to carry out the reaction at 2 or more different temperature levels first using a comparatively low temperature and later increasing temperature to obtain the final stages of polymerization.

By the way of example and not limitation of suitable primary and secondary diamines useful in preparing polythioureas to be used in the practice of the invention can be mentioned:

NH₂—CH₂—CH₂—NH₂

1,2-diaminoethane

NH₂—CH₂—CH₂—CH₂—NH₂

1,3-diaminopropane

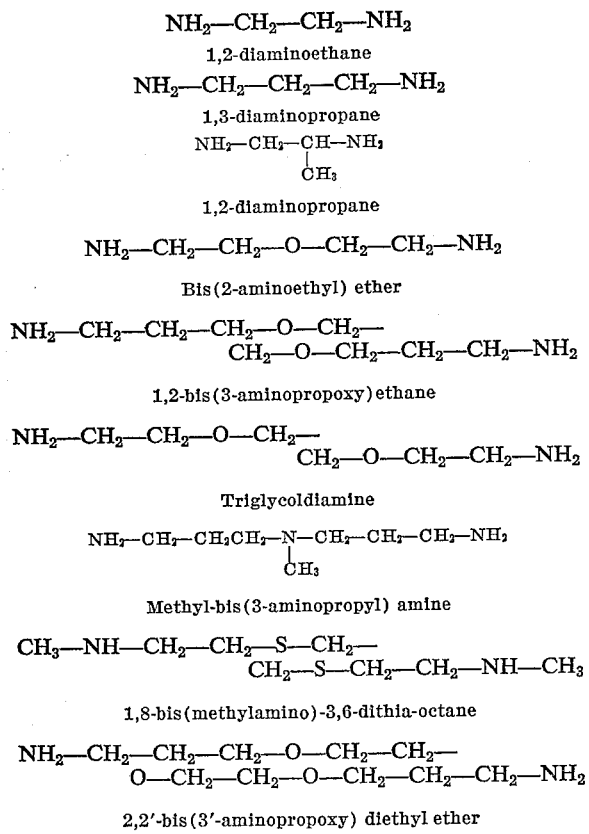

1,2-diaminopropane

NH₂—CH₂—CH₂—O—CH₂—CH₂—NH₂

Bis(2-aminoethyl) ether

NH₂—CH₂—CH₂—CH₂—O—CH₂—
               CH₂—O—CH₂—CH₂—CH₂—NH₂

1,2-bis(3-aminopropoxy)ethane

NH₂—CH₂—CH₂—O—CH₂—
               CH₂—O—CH₂—CH₂—NH₂

Triglycoldiamine

NH₂—CH₂—CH₂CH₂—N—CH₂—CH₂—CH₂—NH₂
                        |
                        CH₃

Methyl-bis(3-aminopropyl) amine

CH₃—NH—CH₂—CH₂—S—CH₂—
               CH₂—S—CH₂—CH₂—NH—CH₃

1,8-bis(methylamino)-3,6-dithia-octane

NH₂—CH₂—CH₂—CH₂—O—CH₂—CH₂—
    O—CH₂—CH₂—O—CH₂—CH₂—CH₂—NH₂

2,2'-bis(3'-aminopropoxy) diethyl ether

It will be seen that all of the foregoing compounds meet the requirement as stated herein. Of course, those skilled in the art will understand that the diamine should not contain groups which under the conditions employed for the formation of the polythiourea polymer are reactive with the diamines themselves or the carbon disulfide. Also those skilled in the art will understand that when the polythioureas are to be prepared from a diamine and a reactant other than carbon disulfide, e.g. a bis-(dithiocarbamate) or a diisothiocyanate, the other reactant should conform to the requirements stated herein. It will be apparent that where a single diamine and carbon disulfide are the reactants each recurring unit in the polythiourea molecule will be the same. However, where a mixture of diamines is reacted with carbon disulfide or where a diamine and another compound such as a diisothiocyanate are reacted, the polythiourea polymer can contain recurring units that differ from each other within the same molecule depending upon the starting material.

Polysulfide polymers usable in making the resins of the invention are described in detail in the text, "The Chemistry of Commercial Plastics," by Wakeman (1947), page 600 et seq., and in many United States patents the earliest of which issued in the late 20's or the early 30's, e.g., such patents as U.S. 1,890,191 issued to Joseph Patrick, who is credited with making the basic discovery of these polysulfide polymers. These polysulfides can be represented by the following type formula in which the "chain" contains carbon atoms as the terminal members of the "chain" but which can also contain internally in the chain one or more hetero-atoms such as oxygen, sulfur or nitrogen:

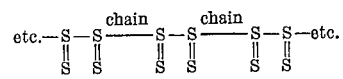

Of the hetero-atoms, oxygen, sulfur and nitrogen which can be contained at intermediate points in the "chain," the preferred one is oxygen. The "chain" must contain at least one carbon atom and preferably does not contain more than about 13 atoms, some of which can be hetero-atoms. Where a plurality of hetero-atoms is present in the "chain," they should be separated from each other by at least one and preferably two or more carbon atoms. The "chain" can be an unbranched chain, or can have substituents branched off from the atoms composing the chain. It is required that the terminal members of the "chain" be carbon atoms. The side sulfurs or at least a portion of them can be eliminated by treating the formed polymer with caustic soda at elevated temperature as will be described in more detail below to change the polytetrasulfide polymer to one containing less sulfur down to the ultimate of a polydisulfide polymer. Thus polymer chains can be formed having the following formula

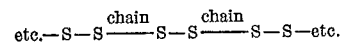

or a formula such as the following wherein an intermediate amount of sulfur is contained as compared to the polymer chains designated above:

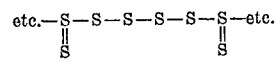

Actually, as indicated by U.S. 2,195,380 polymer chains can be built up having from 2 to 6 sulfur atoms in each sulfur group separating the "chains" giving polysulfide polymers having a formula such as the following:

wherein "chain" is as defined hereinabove.

Those skilled in the art having had the benefit of the present disclosure will understand various types of reactants and the reaction procedures available for making polythioureas. As a matter of convenience and referring to a preferred class of reactants the discussion given hereinafter will be principally concerned with the reaction of an aliphatic dihalide with a metal polysulfide such as sodium polysulfide. For example U.S. 2,363,614 indicates a number of different types of organic compounds that can be used in place of aliphatic dihalide, and it should be understood that the various other types of reactants such as those suggested in this patent can also be used which will be understood by those skilled in the art.

The fundamental reaction involved in the manufacture of elastothiomers is one of double decomposition between aliphatic dihalide and sodium polysulfide or other metal polysulfide. The reaction is carried out by slowly adding the dihalide with vigorous agitation to an aqueous solution of sodium polysulfide prepared from caustic soda and sulfur. The gravity of the polysulfide solution is adjusted to about the same density as the halide and a dispersing agent is preferably employed to facilitate reaction, especially in case a latex is desired as the final product. Peptized starch and protein have been suggested as suitable dispersion agents, but the most satisfactory material appears to be magnesium hydroxide used to the extent of 0.5–1% of the water present. A water miscible alcohol may also be added to aid intimate contact of the reactants. In carrying out this condensation excess polysulfide is employed, if a rubber-like polymer is desired, since normally if the dihalide exceeds the stoichiometric equivalent of sodium polysulfide present, a viscous liquid results. The reaction between aliphatic dihalide and polysulfide is exothermic. Proper temperature control must be maintained either by cooling or by regulating the rate of addition of the dihalide. Although a reaction occurs at room temperature it is best carried out around about 70° C. under a reflux or in an autoclave. Depending on conditions condensation may require from about 2 to 6 hours.

On completion of the reaction the suspension is allowed to settle and is decanted and washed free from excess sodium polysulfide, if any, and sodium chloride formed as a by-product. The elastothiomer is then coagulated with hydrochloric acid. Before precipitation the polytetrasulfide may be treated further with caustic soda and by heating at 83° C. for 1 hour. This operation eliminates the side sulfurs thus yielding a polydisulfide. The reverse reaction, that is addition of sulfur to the polydisulfide, can be brought about by heating with elemental sulfur for 24 hours.

By way of example and not limitation of suitable aliphatic dihalide useful in preparing polysulfide to be used in the practice of the invention can be mentioned:

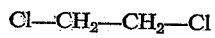

1,2-dichloroethane

1,3-dichloropropane

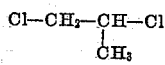

1,2-dichloropropane

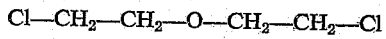

Bis(2-chloroethyl) ether

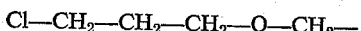

1,2-bis(3-chloropropoxy)ethane

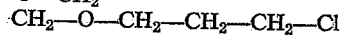

Bis(2-chloroethoxy)ethane

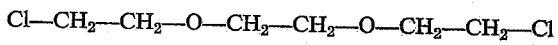

Methyl-bis(3-chloropropyl) amine

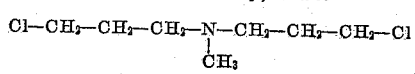

1,8-dichloro-3,6-dithia-octane

2,2'-bis(3'-chloropropoxy) diethyl ether

It will be seen that all of the foregoing compounds meet the requirement stated herein. Of course, those skilled in the art will understand that the dichlorides should not contain groups which under the conditions employed for the formation of the polysulfide polymer are reactive with the dichlorides themselves or the sodium polysulfide. Also, those skilled in the art will understand that when the polysulfides are to be prepared from compounds other than dichlorides or sodium polysulfide, as is well known in the art, the other reactants should conform to the requirement stated herein, such that the polysulfide polymer has the structure set forth hereinabove and contains recurring units in the polymer chain having the formula $-X-S_{2-6}-X-$ wherein X is defined hereinabove as "chain." It will be apparent that where a single dichloride and sodium polysulfide are the reactants each recurring unit in the polysulfide molecule will be the same. However, where a mixture of dichlorides is reacted with sodium polysulfide the polysulfide polymer can contain recurring units that differ from each other within the same molecule, depending on the starting materials.

To make the blended co-cured resins of the invention one or more each of the polythiourea polymer and polysulfide polymer described are blended together in any desired portion and co-cured. Normally to obtain a really substantially different resin the polymer mixture should contain at least about 5% parts by weight of the polymer component present in the smaller amount per 95 parts by weight of the polymer present in the larger amount, and either the polythiourea or the polysulfide component can be present in the mixture in the smaller amount. At least about 2% of either polymer in the blend will affect the characteristics of the final cured resin to a measurable degree, however. It will be obvious that it may be possible to add minor amounts of other types of polymers also. The polymers can be blended in various ways generally well known, depending on the characteristics of the particular polymer to be blended. "Baker-Perkins" mixers might be used if the polymers were viscous liquids and a rolling mill might be used if the polymers were semi-solid. The polymer mixture might be heated to an elevated temperature to melt solid polymer or to increase the fluidity of viscous polymer for improved blending, provided temperatures were not used that would cause substantial decomposition of either or both components of the polymer mixture. Normally it would be preferred to add the curing agent or agents to the polymer mixture after blending the polymer, although this operation can be carried on simultaneously particularly if the curing agents are not too-fast acting or contain curing inhibitors. If the curing agent is particularly fast-curing, it will normally be preferred to mix the curing agent into the polymer blend as fast as possible and at as low a temperature as possible to avoid having the polymer blend set up or cure before it can be removed from the mixing vessel; however, there will be times when it will be desired to have the polymer blend cure quickly in the particular vessel or structure into which it has been poured. Rate of curing can in many cases be slowed down by curing inhibitor. Curing agents can be mixed or blended into the polymer mixtures in a similar manner as the polymers are blended or by other conventional means.

Depending on the particular curing agent or agents used and to a certain extent on the particular polymer blend being cured, curing can be carried out at room temperature or below but normally it will be preferred to do the curing at elevated temperature. Usually temperatures as high or higher than 175° C. should not be used in curing since substantial decomposition of the polysulfide polymer component will normally result, and curing should usually be carried out at about 150° C. or lower.

Many different types of curing agents can be used to produce the resins of the invention, but it must be realized that some curing agents will be preferred and will give superior properties as compared to other curing agents. Some of the curing agents will cure both the polythiourea components and the polysulfide components of the polymer blend in which case a single curing agent can be used. In other cases it will be necessary to use separate curing agents for the polythiourea and the polysulfide polymer components. Normally, the amount of curing agent used will be less than about 15% by weight based on the polymer blend and preferably less than 10% by weight. Where particularly active curing agents are used 5% or less by weight of the curing agent based on the polymer blend can be used. If more than one curing agent be used, e.g., a different one specifically designed to cure each polymer component, the basis for the amount of curing agent to be added will usually be the amount of the respective component to be cured in the polymer blend.

An illustrative but not limiting listing of curing agents especially suitable for curing the polythiourea component of the polymer blend is as follows: Epoxide resins which are condensation products of epichlorohydrin and a biphenol. Suitable curing agents of this nature are marketed by the Shell Chemical Corporation under the trademark "Epon," a particularly suitable type of this resin being "Epon" 828. "Epon" 828 has a molecular weight of about 350 and an epoxy value of 0.5. Actually, any compound containing 2 or more epoxy groups will be a good curing agent, i.e., a polyepoxy compound. Another type of especially suitable cross-linking agent is those compounds containing reactive methylol groups such as trimethylolmelamine. Other examples of this type of curing agent are dimethylolurea, dimethylolmethylene-bis fumaramide, melamineformaldehyde and urea-formaldehyde resins containing reactive methylol groups, etc. Another type of suitable cross-linking agents is formaldehyde and formaldehyde-liberating substances. Paraformaldehyde is one of the most convenient and effective forms of formaldehyde to use. Other types of suitable cross-linking or curing agents for the polythiourea polymer components are aliphatic dialdehydes such as glyoxal, epichlorohydrin, lead oxide, particularly lead peroxide and lead hexoxide, polyisocyanates, especially diisocyanates such as metatoluenediisocyanate and naphthalene-diisocyanate, and dihalides such as hexamethylenedibromide, etc., are also good cross-linking agents.

An illustrative listing of suitable curing or cross-linking agents for the polysulfide polymer component is as follows: metal oxides, e.g. zinc oxide, cupric oxide, lead peroxide, lead tetroxide, etc., are especially effective curing agents for the polysulfide polymers. A detailed listing of many other suitable curing agents for the polysulfide polymer is found in U.S. 2,195,380, page 11. It has also been found that epoxides such as has been described as curing agents for the polythiourea are also very good curing agents for the polysulfide polymer.

Although a number of curing agents have been listed above for curing the polythiourea polymer and the polysulfide polymer, many more curing agents are known in the art to be usable for curing each of these component polymers, which curing agent can be used in making the resins of the invention, and in any event the invention does not particularly lie in the use of any specific curing agent.

The invention will be more clearly understood from the following detailed description of specific examples thereof:

EXAMPLE 1

This describes in detail the preparation of a polythiourea polymer. A tared liter flask fitted with a nitrogen inlet, Trubore stirrer, thermometer, dropping funnel and reflux condenser vented through a mineral oil trap, was purged with nitrogen and charged with 265.8 grams (1.508 moles) of 1,2-bis(3-aminopropoxy)ethane and 532 ml. of methanol. Exothermic heat of mixing was noted. The mixture was cooled in an ice bath, the nitrogen purging stopped, and with good agitation 120.6 grams (1.584 moles), 5% excess, of carbon disulfide was added gradually via the dropping funnel, as follows:

| Minutes | ° C. | CS₂, ml. | Remarks |
|---|---|---|---|
| 0 | 2 | 0 | Start. |
| 10 | 16.5 | 34 | |
| 15 | 19 | 50 | Clear, faint green. |
| 20 | 18.7 | 64 | Slightly milky. |
| 30 | 17 | 95 | All CS₂ in. |
| 31 | 16.5 | | Suddenly, opaque white. |

After cooling to 4° C. during 1 hour, the stirrer was stopped, and the mixture separated into layers. The upper layer (about 33% of the total) was clear, almost colorless and every fluid. The bottom layer was clear, very light yellow and viscous. On stirring and warming to 25° C. the mixture became homogeneous; on recooling to 5° C., phase separation reoccurred. The supernatant layer was decanted and the residue was stored overnight under nitrogen at room temperature. The flask was then fitted with a nitrogen bubbler, placed in an oil bath, and the condenser was changed from reflux to distillation position.

Solvent was then removed by distillation with the stirrer operating. Distillation was essentially complete after 35 minutes, the oil bath temperature going from 98 to 128° C. At this point slow evolution of hydrogen sulfide began and continued at an increasing rate during the next 50 minutes, as the bath temperature was increased to 170° C. After 5 more minutes at 170°-174° C. gas evolution essentially stopped, and the viscous, clear, light green polymer was bubbled with nitrogen and stirred and heated during the next 3.5 hours, at a 180-195° C. bath temperature.

After cooling the resin under nitrogen to about 140° C., 0.75 gram of 2-mercaptobenzothiazole (an antioxidant) was stirred in, and the hot viscous mass was dumped into a glass tray, greased with silicone grease. The cooled product was a tacky, clear, very-light-amber semi-solid. The specific viscosity of the product at 1% by weight concentration in dimethylformamide at 25° C. was 0.263.

EXAMPLE 2

This is essentially a duplicate experiment of Example 1 using the same reactants except that a much larger batch of polymer was made in this case. The charge of diamine was 6.902 moles and the ratio of CS₂ to diamine was 1.03. The product in this case was a light-amber colored semi-solid having a specific viscosity of 0.311 at 1% by weight concentration in dimethylformamide.

EXAMPLE 3

This describes the preparation of another linear polythiourea polymer. Although the same diamine was used as was used in Examples 1 and 2 the ratio of carbon disulfide to diamine was appreciably different and a substantially different product resulted. The carbon disulfide/diamine ratio was 0.90, i. e., instead of using an excess of carbon disulfide as in Examples 1 and 2, an excess of diamine was used in this case. The resultant light-amber colored product was a low molecular weight, amine-terminated polythiourea.

EXAMPLE 4

This example describes the properties of the two commercial polysulfide polymers used in making resins of the invention. The polysulfide polymer used in most of the experimental blends was "Thiokol" LP-2, marketed by the Thiokol Corporation. This polymer in undiluted form is a viscous amber liquid having a viscosity of about 400 poises at 25° C., a specific gravity of about 1.27, and a molecular weight of about 4000. It is reported that the average structure of this polymer is as follows:

$$HS-(C_2H_4-O-CH_2-O-C_2H_4-S-S)_{23}$$
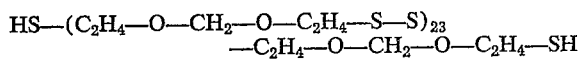
$$-C_2H_4-O-CH_2-O-C_2H_4-SH$$

It is also reported that there is an occasional side chain mercaptan group. Other detailed information on this polymer is published in the trade literature thereon. This polymer was probably made or could be made by reacting bis(2-chloroethoxy)methane with sodium polysulfide in the conventional manner reported hereinabove and subjecting the formed polymer to sodium hydroxide treatment and heat to remove the side chain sulfurs.

A different type of polysulfide polymer of unknown structure was used in making up one resin of the invention which is reported in Table 3 below. This resin is "Thiokol" FA. Typical properties of this polymer are that it has the appearance of a crude rubber which is light brown in color and has a specific gravity of 1.34.

Table 1 below describes curing tests on a number of different blends of polythiourea and polysulfide polymer. In these tests the polythiourea polymer was blended with the polysulfide polymer by mixing these polymers at temperatures in the range of about 50–80° C. After the polymer mixture had cooled to room temperature the curing agents were then mixed into the blended polymer.

*Table 1.—Curing tests*

| Blend No. | PTU, No. | PS, PHR | Additives, PHR | | | | Curing Time At 25° C., hours |
|---|---|---|---|---|---|---|---|
| | | | PF | ZnO | PbO₂ | SA | |
| 1 | 3 | 100 | | | | | No Cure (24 hrs.). |
| 2 | 3 | 100 | 8 | | | | 3. |
| 3 | 3 | 100 | 7.5 | 20 | | | 1. |
| 4 | 3 | 100 | | | 20 | | 0.25. |
| 5 | 3 | 100 | 10 | | 20 | | 0.17. |
| 6 | 3 | 100 | 10 | | 10 | | 0.33. |
| 7 | 3 | 100 | 4 | | 10 | 2 | 0.42. |
| 8 | 3 | 100 | 4 | | 10 | | 0.33. |
| 9 | 3 | 100 | 4 | 20 | | | 16. |
| 10 | 1 | 200 | 1 | | 14 | 3 | 24. |
| 11 | 1 | 200 | 2 | | 14 | | 0.30. |
| 12 | 1 | 300 | 2 | | 21 | | 0.30. |

PTU—Polythiourea polymer.
PS—Polysulfide polymer, which was "Thiokol" LP-2.
PHR—Parts per hundred parts based on the polythiourea.
PF—Paraformaldehyde.
SA—Stearic acid.

The PTU, polythiourea polymers used in Table 1 i.e. Nos. 1 and 3 are described in detail in the corresponding examples and the PS, polysulfide polymer used in this table was the "Thiokol" LP-2 polymer described in detail in Example 4. All the additives described in Table 1 are curing agents with the exception of the stearic acid which is a curing inhibitor designed to slow down the curing process. The compounded mixture in each case containing the curing agents or agent was spread in a 1/16 inch layer on a chrome plate metal surface and allowed to cure at room temperature, i.e., about 25° C. The time to cure in each instance was reported as the time required for the polymer to take on rubbery characteristics.

In Table 2 below the properties of cured solvent-cast films of resins of the invention are reported. The uncured resin mixture used in the test of Table 2 consisted of mixing a 50% by weight solution of the polythiourea product of Example 2 in dimethylformamide with 43 parts by weight of "Thiokol" LP-2 per hundred parts of the polythiourea polymer. This polysulfide polymer is described in detail in Example 4, above. Thus a resin solution has been formed having 50 parts of polythiourea, 21.5 parts of polysulfide polymer and 50 parts of dimethylformamide. After mixing in the curing ingredients, which are shown for each film in Table 2, the ingredients which were mixed in 1 by 2" glass vials were allowed to stand for about 30 minutes, or evacuated at water pumped vacuum for about 3 minutes to remove entrapped air bubbles. The mixtures were then spread on 6 x 6 x 0.1" 24 ST aluminum plates coated with "Teflon." These cast films were dried for 1 hour at 55° C. and cured for 1 hour at 105° C., then the films were stripped off and left hanging freely exposed to air for at least two weeks before testing. In drying and curing procedures forced air ovens were used to promote solvent and gaseous decomposition products removal. Table 2 below should be consulted for the curing additives and the test results.

*Table 2.—Properties of cured solvent cast films*

| Film No. | Additives, PHR | | | | Tensile Tests | | |
|---|---|---|---|---|---|---|---|
| | "Epon" 828 | PbO₂* | MF | SA | Strength, p.s.i. | Percent Elongation | 300 Modulus p.s.i |
| 1 | 5 | 7 | | 1 | 615 | 595 | 285 |
| 2 | 5 | 7 | 5 | | 870 | 580 | 405 |
| 3 | | 7 | 5 | 1 | 900 | 625 | 380 |

PHR—Parts per hundred parts of polythiourea polymer.
*—Parts per hundred parts of polysulfide polymer.
MF—Melamine-formaldehyde condensation product.
SA—Stearic acid.

At the end of the two week period for the aging of the films, tensile specimens were made for the tensile strength tests. The testing speed at which each example was stretched in the test was 20 inches per minute. The various tensile strength measurements are reported in the last three columns of the table. The first of these columns reports the tensile strength of the samples in pounds per square inch guage (p.s.i.g.), calculated in the conventional manner. The second column reports the percent elongation of the sample just prior to breakage and the third column reports the force required to elongate the sample to 300 percent of its unstretched length. These tensile strength tests are of course calculated and measured in the conventional manner taking into consideration the cross sectional area of the test specimen when calculating the measurements for columns 1 and 3 of the strength test.

It will be noted in examining Table 2 above that two new curing additives have been introduced, namely "Epon" 828 and MF. These two additives have been described somewhat above in discussing the curing agents. "Epon" 828 is an epoxy resin said to have a molecular weight of about 350, a specific gravity, 20/4° C. of 1.168, and an epoxy value, eq./100 g., of 0.5 The general formula for this type is as follows:

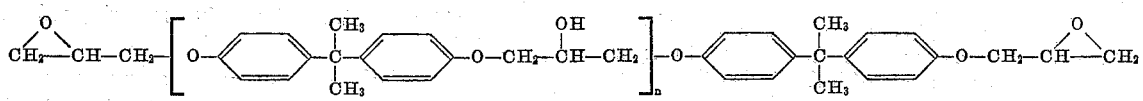

These "Epon" resins are condensation products of epichlorohydrin and Bis Phenol-A (2,2-bis(4'-hydroxyphenyl)propane). The additive MF is a condensation product of malamine and formaldehyde which is a hygroscopic crystalline powder. Methods of making this type of resin are described in detail in U.S. 2,260,239, when discussing intermediate products produced by stopping condensation at an intermediate stage. These resins have free methylol groups which react in the curing process of the resins of the invention.

Table No. 3 below describes the testing of compounded press cured resins of the invention. These mixed polythiourea and polysulfide polymers were compounded on 3 by 8" Thropp rolls, the carbon black and stearic acid being added first to the mixed polymers in amounts of 45 parts of carbon black and 1 part of stearic acid per 100 parts of mixed polymer, the paraform or other curing agents added last. Since the polythioureas have very low melt viscosity, cooling water was usually circulated through the mill roll to keep the mass in a firm removable state and especially to prevent too much pre-cure on the rolls.

Moldings were made as 4 by 4" slabs about 0.04" thick using an appropriate stainless steel template between 0.5 inch-thick chrome-plated steel cauls. The listed cure temperature refers to platen temperatures. Measurement with a surface pyrometer showed that caul temperatures were 3–4° C. lower than the platen temperature. It was necessary to use silicone mold release to prevent adhesion. The tensile specimens were di-cut from the cured slab and the testing was carried out in the conventional manner. This test data on the properties of the compounded press-cured materials is shown in Table 3 below:

linear polythiourea polymer having recurring units of the formula $$-X-NR-\underset{\underset{S}{\|}}{C}-NR-$$

where R is selected from the class consisting of hydrogen and monovalent hydrocarbon radicals, and X consists of a chain having terminal carbon atoms and other atoms selected from the class consisting of carbon and oxygen, nitrogen and sulfur hetero-atoms with hetero-atoms being separated from other hetero-atoms by at least one carbon atom, and a linear polysulfide polymer having recurring units of the formula $$-S_{2-6}-X-$$

*Table 3.—Properties of press-cured materials*

| No. | PTU, No. | PS, PHR | Additive, PHR | | | | Cure | | Tensile Tests | | | Hardness Shore A | Clash-Berg $T_t$, °C. |
|---|---|---|---|---|---|---|---|---|---|---|---|---|---|
| | | | PF | PbO$_2$** | ZnO** | "Epon" 828 | Min. | °C. | Strength, p.s.i. | Percent Elongation | 300% Modulus, p.s.i. | | |
| 1 | 1 | | 1.2 | | | | 15 | 175 | 610 | 700 | 450 | 45 | |
| 2 | 1 | | 1.8 | | | | 10 | 175 | 2,170 | 340 | 1,860 | 62 | −5 |
| 3 | 1 | 30 | 1.8 | 7 | | | 10 | 175 | 1,370 | 160 | | 74 | −6 |
| 4 | 1 | 30 | 1.5 | 7 | | 2.5 | 10 | 175 | 1,290 | 200 | | 68 | −5 |
| 5 | 1 | 30 | 1.8 | 7 | | | 10 | 140 | 2,260 | 260 | | 67 | |
| 6 | 1 | 30 | 1.5 | 7 | | 5.0 | 10 | 140 | 2,385 | 300 | | 64 | −18 |
| 7 | 1 | 30 | 1.5 | 7 | | 2.5 | 10 | 140 | 1,985 | 265 | | 67 | −17 |
| 8 | 2 | | 2.4 | | | | 10 | 140 | 1,910 | 245 | | 65 | −3 |
| 9 | 2 | | 1.5 | | | | 15 | 175 | 2,720 | 475 | 1,750 | 67 | |
| 10 | 2 | 20 | 1.5 | 7 | | | 15 | 140 | 3,435 | 460 | 2,158 | 72 | 1 |
| 11 | 2 | 30 | 1.5 | 7 | | | 15 | 140 | 2,980 | 390 | 2,243 | 73 | −1 |
| 12 | 1 | 40 | 1.5 | | | 3.9 | 10 | 140 | 1,385 | 195 | | 70 | |
| 13 | 1 | 40 | 1.5 | 3.5 | | 2.0 | 10 | 140 | 1,200 | 195 | | 65 | |
| 14 | 2 | 50 | 1.5 | 7 | | | 15 | 140 | 2,825 | 353 | 2,385 | 75 | −1 |
| 15 | 1 | 50 | 1.5 | | 10 | | 40 | 150 | 1,165 | 215 | | 67 | −10 |
| 16 | 1 | 60 | 1.5 | 7 | | 3.9 | 10 | 140 | 880 | 110 | | 74 | |
| 17 | 2 | 70 | 1.5 | | | | 15 | 140 | 2,250 | 263 | | 76 | −2.5 |

PTU—Polythiourea polymer.
PS—Polysulfide polymer used was "Thiokol" LP-2, except for No. 15 which was "Thiokol" FA.
PHR—Parts per hundred parts of PTU.
**—Parts per hundred parts of PS rather than PTU.
PF—Paraformaldehyde.

The test data above represents the testing of compounded synthetic rubber-like material made from the resins of the invention. The polythiourea polymers used are described in detail in Examples Nos. 1 and 2. The polysulfide polymers are described in detail in Example 4. All of the curing agents are described in detail above when discussing the curing agents or in connection with a discussion of Tables 2 and 3 above. The hardness test is a test conventionally used for measuring the hardness of rubber-like material which test is called the "Shore A" durometer test for hardness. The last test reported in Table 3 is a test of the low temperature properties of the rubber. This test is the conventional Clash-Berg. It will be noted from this test that the materials having the best low temperature flexibility are Nos. 6 and 7 wherein "Epon" 828 was one of the curing agents. In general it can be said from the data of Table 3 that the cures conducted at temperatures of 175° C. produced inferior product. This is too high a temperature to cure the materials producing decomposition of the polysulfide components.

The co-cured resins of the invention can be used in a great many ways, e.g. in molded goods, gaskets, saturation and plying of fabric, for making film, for spinning into yarn, to make plastics, textiles, coatings, adhesives, sealants, etc.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A resin composition comprising a mixture of a wherein X is an defined hereinabove, co-cured to a cross-linked resin.

2. The composition of claim 1, wherein the weight ratio of said polythiourea polymer to said polysulfide polymer is in the range of from about 5:95 to about 95:5.

3. The composition of claim 1, wherein the curing agent cross-linking the polymer chains comprises an epoxy resin having epoxy oxygen atoms attached to adjacent carbon atoms.

4. The composition of claim 3, wherein said polythiourea polymer has recurring units of the formula $$-C_3H_6-O-C_2H_4-O-C_3H_6-NH-\underset{\underset{S}{\|}}{C}-NH-$$

and said polysulfide polymer has recurring units of the formula $$-C_2H_4-O-CH_2-O-C_2H_4-S-S-$$

5. The composition of claim 1 wherein said polythiourea polymer has resurring units of the formula $$-C_3H_6-O-C_2H_4-O-C_3H_6-NH-\underset{\underset{S}{\|}}{C}-NH-$$

and said polysulfide polymer has recurring units of the formula $$-C_2H_4-O-CH_2-O-C_2H_4-S-S-$$

6. The composition of claim 4 wherein said epoxy resin is a condensation product of epichlorohydrin and 2,2-bis(4-hydroxyphenyl)propane.

References Cited in the file of this patent
UNITED STATES PATENTS

| | | |
|---|---|---|
| 2,356,764 | Kern | Aug. 29, 1944 |
| 2,782,089 | Rakowski et al. | Feb. 19, 1957 |
| 2,816,879 | Wittbecker | Dec. 17, 1957 |
| 2,884,401 | Wesp | Apr. 28, 1959 |